April 13, 1954 K. K. WYCKOFF 2,675,443
ELECTRIC CONTROLLER
Filed March 9, 1950 3 Sheets-Sheet 1

FIG.I.

INVENTOR
KENNETH K. WYCKOFF
BY
ATTORNEY

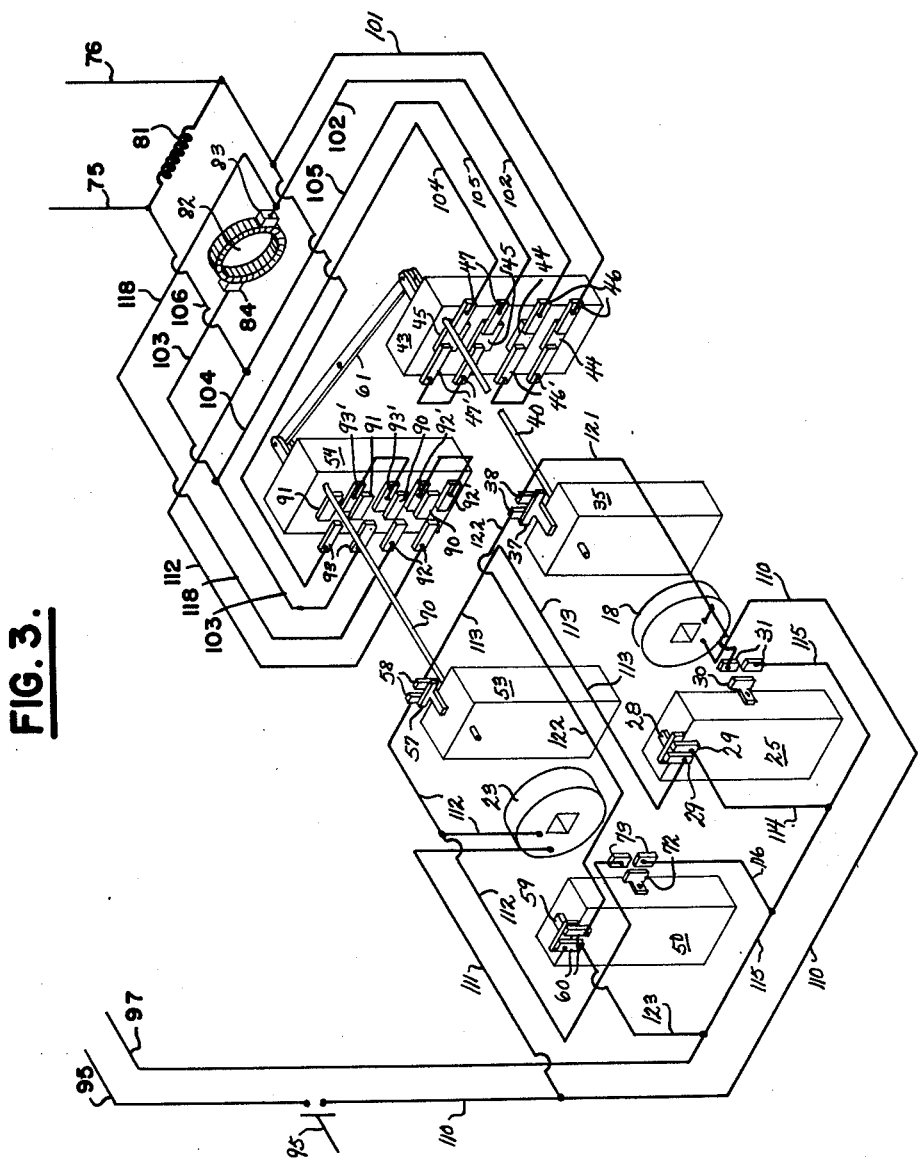

Patented Apr. 13, 1954

2,675,443

UNITED STATES PATENT OFFICE

2,675,443

ELECTRIC CONTROLLER

Kenneth K. Wyckoff, San Diego, Calif., assignor to the United States of America as represented by the Secretary of the Navy Application March 9, 1950, Serial No. 148,681

4 Claims. (Cl. 200—98)

The present invention relates to an electromagnetic contactor for an electric motor, and more particularly to an electromagnetic contactor which reverses its position each time its actuation circuit is closed.

In certain types of echo ranging systems, it is necessary to reverse the direction of the moving radiation system, and since the radiation system is usually driven by an electric motor, to reverse an electric motor. It is necessary that the motor reverse quickly and that the electro-magnetic contactor used to control the motor be rugged and reliable. Presently available contactors have developed considerable contact difficulties when employed in shipboard installations. It is desirable to simplify the control circuit so that only a single control circuit is required to control the reversing circuit.

The present invention relates to a rugged snap-action reversing contactor which reverses its position each time a single control circuit is energized without regard to the length of time during which the control circuit is energized.

It is an object of the present invention to provide a rugged reversing contactor for an electric motor.

It is a further object of the present invention to provide a reversing contactor which is relatively insensitive to shock loading by rough water or enemy action.

It is a still further object of the present invention to provide a reversing electromagnetic contactor which requires only a single control circuit.

It is a further object of the present invention to provide a reversing electromagnetic contactor which is maintained in a desired position by means of spring pressure.

It is a yet further object of the present invention to provide an electromagnetic switch which operates auxiliary contacts in a desired sequence.

It is a further object of the present invention to provide an electromagnetic switch having two operating movements in a positive sequence.

It is a final object of the present invention to provide a reversing electromagnetic contactor which is unaffected by the period of energization of its control circuit.

Further objects and advantages of the present invention will be made apparent by reference to the following description and to the appended drawings in which:

Figure 3 is a wiring diagram illustrating the use of the present invention.

Figure 1:
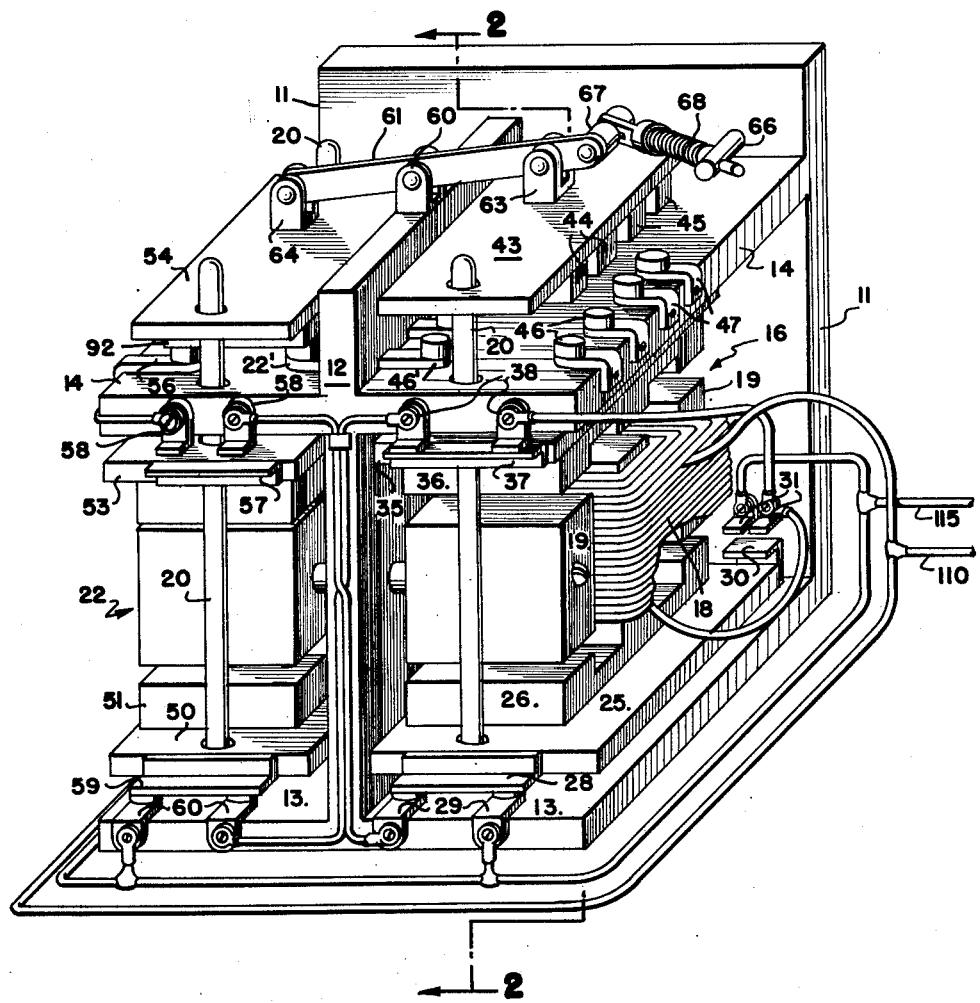
Figure 1 is a plan view in prospective of the contactor of the present invention.

Referring now to Figure 1 of the drawings, the supporting frame of the contactor consists of a base plate 11, a longitudinal partition i. e., an end support 13, and a transverse support 14, preferably composed of insulating material although non-magnetic metallic substances may also be employed if desired. The several supporting members may be molded into a unitary structure if desired or may be fabricated.

A pair of actuating magnets 16 and 22 are attached to the sides of the longitudinal partition 12 between the end support 13 and the transverse support 14, the actuating magnets and their associated structure being duplicates, and for this reason, only one will be described in detail herein.

Figure 2:
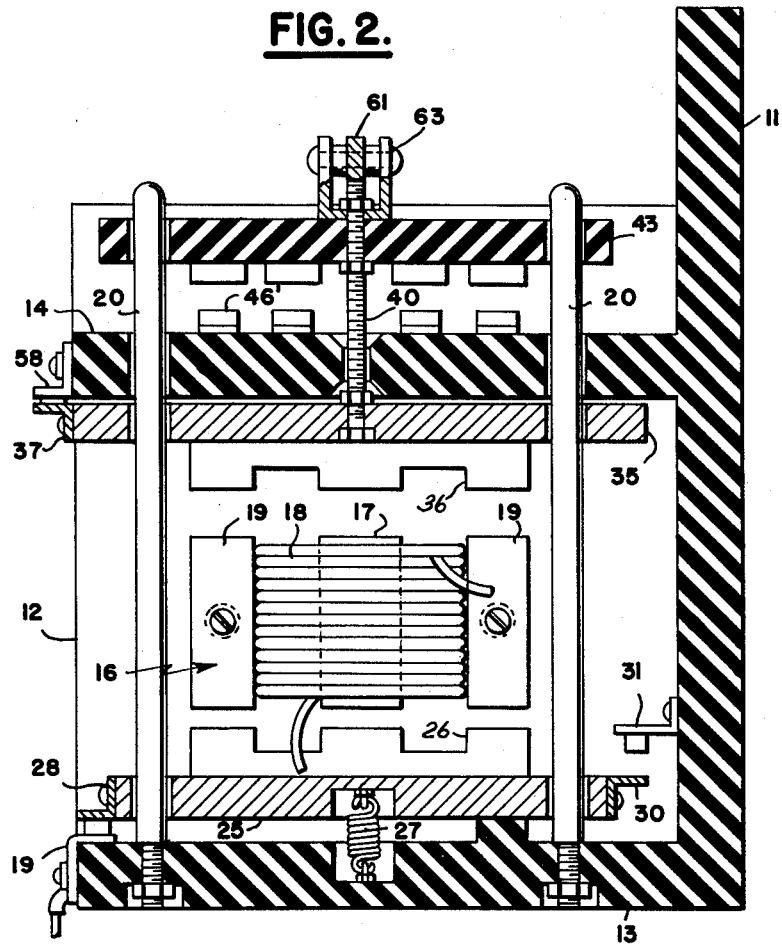
Figure 2 is a cross-sectional view taken on line 2—2 in Figure 1.

As best seen in Figure 2 of the drawings, the actuating magnet 16 consists of a horizontal core 17 wound with a coil 18 and a pair of core members 19 parallel to the core 17. The coil 18 is of conventional design well-known to those skilled in the art. Each actuating magnet is provided with a fast-acting and a slow-acting armature slidably mounted adjacent the ends of the core members 17 and 19 and diamagnetic rods 20 passing through the end support 13 and the transverse support 14. It will be apparent that the armatures may be hinged rather than slidably supported, if desired, or other well-known mechanical methods may be employed.

The fast-acting armature 25 is slidably mounted on the rods 20 between the actuating magnet 16 and the end support 13 and carries the magnetic core member 26 thereon. The bridging contacts 28 and 30 are also mounted on the armature 25, which is biased to its open position by a light spring 27 attached between the armature and the end support 13. The contact pairs 29 and 31 cooperating with the bridging contacts 28 and 30 are carried by the end support 13 and the bottom plate 11 respectively, the contacts 29 being normally closed while the contacts 31 are normally open.

The magnetic core member 26 is positioned close to the operating coil 18 so as to be drawn to the actuating magnet and in moving to its actuated position, it magnetically connects the core 17 and the core members 19 to form a magnetic circuit for the operating coil. The magnetic circuit thus formed greatly increases the magnetic flux adjacent the slow acting armature 35.

The slow acting armature 35 is slidably mounted on the rods 20 between the actuating magnet and the transverse support 14 and carries the core member 36 and the bridging contact 37 cooperating with the contacts 38 mounted on the transverse support 14. The core 36 is spaced from the actuating magnet 16 by a distance appreciably greater than the spacing between the core 26 and the actuating magnet, so that the operating coil 18 cannot actuate the armature 35 until the armature 25 has reached its actuated position.

The operating rod 40 is attached to the armature 35 and passes through the hole 41 in the transverse support 14 to the contact support 43. The contact support 43 is also slidably mounted on the rods 20 and carries a plurality of bridging contacts 44, 45 on the side adjacent the transverse support 14, a plurality of contacts 46, 47 being mounted on the transverse support 14 in a position to cooperate with the bridging contacts 46, 47.

Referring to Figure 1, a bracket 60 is mounted on the longitudinal partition 12 and carries the lever 61 pivotally mounted therein. The contact supports 43, 54 are provided with pivotal brackets 63, 64, respectively which are attached to the lever 61 so that the contact supports move in opposite directions when the lever is rotated about its attachment to the bracket 60.

The post 66 is attached to the base plate 11 at a position in the same transverse plane as the bracket 60 and is provided at its upper end with an extendable arm 67 having a spring 68 tending to extend the arm. The outer end of the arm 67 is attached to the end of the lever so that the lever 61 and the arm 67 form a toggle joint and the attached contact supports 43, 54 are urged away from an equidistant position with respect to the transverse support 14. Thus the spring 68 maintains one or the other of the contact supports 43, 54 in a closed position and the other in an open position.

The arrangement and number of contacts carried by the transverse support 14 and of bridging contacts carried by the contact supports 43, 54 will depend upon the circuit in which it is employed. The design of contact systems is old and well-known to those skilled in the art, and the arrangement shown herein is merely illustrative. As shown herein, four contacts are provided on each side of the transverse support 14 and each contact support is provided with two bridging contacts.

The present description is directed to pairs of contacts and a cooperating bridging contact which completes the circuit because it eliminates the need of connections to moving parts and because it extinguishes arcing more rapidly by providing a double break in the circuit. However, other methods may be substituted for that shown if desired.

Referring now to Figure 3, which shows the present invention connected in the circuit of a direct current shunt motor supplied with power from the leads 75, 76 the field 81 of the electric motor is connected directly to the leads, while the armature 82 is connected to the leads 75, 76 through the contacts 44, 45, 46, 47, 90, 91, 92, 93. The control circuit is energized from the leads 95, 97 which may be connected to alternating current or direct current. As illustrated the motor is operating, its armature being energized by a circuit extending from the lead 76 through the wire 101 to the now closed contacts 46, and by the wire 102 to the brush 83 on the armature 82. The brush 84 is connected by the wire 103, wire 104, contacts 47, wire 105, and wire 106 to lead 75.

When the push-button 95 is pressed, a circuit is established to reverse the motor, extending from the push-button 95 through wire 110, wire 111 to the coil 23 of actuating magnet 22, and by wires 112 and 113 to the closed contacts 58, wire 113, the closed contacts 28 and by wires 114 and 115 to the lead 97. Energization of the coil 23 moves the armature 50 to open its contacts 59, 60 and close its contacts 73, which establishes a path shunting the contacts 53 and 29 and extending from the wire 112, 113 through the contacts 73 and the wire 116 to the wire 115. The circuit to the coil 18 of the actuating magnet 16 is opened by the contact 37 on the armature 35 and the contact 30 on the armature 25.

At the time the coil 23 is energized and before the armature 50 has moved against the core, the actuating magnet 22 is incapable of moving the armature 53 against the spring 67. However, when its magnet circuit is interconnected by the armature, the actuating magnet then draws the armature 53 toward it which moves the contact support 43 and the armature 35 away from the actuating magnet 16 and disconnects the armature circuit of the motor from the lead 75, 76. As the armature 53 is moved, it opens the contacts 58, closes the contacts 92, 93 by the contact support 54, opens contacts 46, 47 by the contacts support 43, and closes contacts 38 on the armature 35.

The armature circuit is now as follows: from the lead 75 through the lead 106 to the lead 117, the contacts 92 and the wire 118 to the brush 83 of the armature 82. The brush 84 is connected by the wire 103 to the contacts 93, and through the wire 119 to the lead 76. The polarity of the armature is thus reversed and the motor now operates in the opposite direction. When the push-button 95 is released, the armature 50 returns to its normal position, opening the contacts 73 and closing contacts 60, thus completing the circuit for coil 18 when the push-button 95 is again closed.

When the push-button 95 is again pressed, the coil 18 of the actuating magnet is energized through a circuit extending from the push-button 95 by the wire 110 to the coil 18, wire 121 to the contacts 38, wire 122 to contacts 60, and wires 123 and 115 to the lead 97, the circuit to coil 23 being opened by the contacts 27 and 72. When the armature 25 moves to its actuated position, the auxiliary circuit is established by the contacts 30, 31, and the armature 35 then moves to its actuated position, thus returning the contact supports 43, 54 to their original positions and reversing the rotation of the armature 82.

It should be noted that the proper sequence of operation of the fast armature and the slow armature associated with each actuating magnet is insured by making the pull of the actuating magnet in its normal position less than the force required to actuate the slow-acting armature but sufficient to actuate the fast-acting armature. However, when the core structure carried by the fast-acting armature is moved to abut the magnet core, the magnetic flux is concentrated and the pull then becomes sufficient to draw the slow acting armature to its actuated position. This feature of the present invention precludes the fast-acting armature moving to open the contacts associated therewith until the auxiliary circuit has been established. Furthermore, the normally closed contacts on the fast-acting armature remain open until the push-button is released and thereby prevent energization of the other actuating magnet until the push-button has been released and pressed again.

It will be obvious to those skilled in the art that many changes and modifications may be made in the present invention. The armatures may be hinged rather than slidably supported, and any desired type of contacts may be employed. The number of circuits to be controlled will determine the number of contacts employed and the connections thereto. Both the control circuit and the power circuit may be operated from either direct current or alternating current, as desired.

What is claimed is:

1. In an electromagnetically operated switch, a first and a second actuating mechanism; each of said actuating mechanism comprising an operating coil adapted to be connected to a source of electric power, a first movably mounted armature spaced and biased from one end of said operating coil positioned to be attracted toward said operating coil and to form a portion of a magnetic circuit for said operating coil when in an actuated position, a second movably mounted armature spaced from the other end of said operating coil positioned to be attracted toward said operating coil and said first armature to form another portion of the magnetic circuit thereof and contact means actuated by said first armature; first and second switch members, means connecting one of said switch members to said second armature of each of said actuating mechanism, a centrally pivoted lever having its ends connected to said first and second switch members respectively, and a resiliently biased compressible arm pivotally connected to one end of said lever to form a toggle joint therewith having a restraining force less than the attractive force of said operating coil on the second armature when said first armature is in an unactuated position and more than the attractive force of magnetic circuit of said operating coil on said second armature when said first armature is in an actuated position, whereby energization of one of said operating coils actuates the first armature adjacent thereto to actuate said contact means and thereafter to actuate the second armature adjacent thereto thereby to actuate said switch means.

2. In an electromagnetically operated switch having controlled switch means and a controlling circuit therefor, first and second actuating mechanisms each comprising an operating coil adapted to be energized from a source of electric power, first armatures resiliently mounted adjacent to and spaced from one end of each of said operating coils respectively to form a part of the magnetic circuit therefor, a first set of normally closed contacts carried by said first armatures respectively, second armatures movably mounted adjacent to and spaced from the other ends of each of said operating coils respectively, to be attracted to said operating coil and said first armature associated therewith, a second set of normally closed contacts carried by said second armatures respectively, first and second switch members mechanically connected to said second armatures respectively, a lever pivotally supported near its center and having its ends connected to said first and second switch members respectively and an expandable arm connected to one end of said lever, said expandable arm exerting a restraining force more than attractive force on said second armature by one of said operating coils when said first armature adjacent said operating coil is in an unactuated position and less than the attractive force on said second armature when said first armature is in an actuated position, a first coil circuit comprising the operating coil of said first actuating mechanism serially with said second set of normally closed contacts of said second armature of said first actuating mechanism and said first set of normally closed contacts of said first armature of said second actuating mechanism respectively, a second coil circuit comprising the operating coil of said second actuating mechanism serially connected with said second set of normally closed contacts of said second armature of said second actuating mechanism and said first set of normally closed contacts of said first armature of said first actuating mechanism, and circuit means for connecting said first and second cord circuits in parallel with each other, whereby energization of said paralleled coil circuits energizes only one of said actuating mechanisms to reverse the positions of said first and second switch members.

3. In an electromagnetic switch, first and second actuating magnets each comprising an operating coil and an open magnetic core for said core, first and second movable armatures positioned at respective ends of each of said magnetic cores and each having a de-energized position spaced from said magnetic core and an energized position adjacent said magnetic core, said first and second armatures jointly completing the magnetic circuits of said magnetic cores respectively when said armatures are in their respective energized positions, first resilient means biasing each of said first armatures to their respective de-energized positions, lever means having its ends connected to said second armatures, a pivot for said lever substantially the center thereof, and resilient over-center means connected to said lever means for restraining a respective one of said second armatures to its de-energized position having a restraining force in excess of the attractive force of the respective actuating magnet when the corresponding first armature is in its de-energized position and less than the attractive force of the respective actuating magnet when said first armature is in its actuating position.

4. The device as claimed in claim 3 which includes individualized contact means mechanically connected with each of said second armatures.

References Cited in the file of this patent

UNITED STATES PATENTS

| Number | Name | Date |
|---|---|---|
| 863,185 | Jeffries | Aug. 13, 1907 |
| 1,227,568 | Barber | May 29, 1917 |
| 1,251,594 | Turbayne | Jan. 1, 1918 |
| 1,550,611 | Howe | Aug. 18, 1925 |
| 1,668,841 | Doty | May 8, 1928 |
| 1,694,977 | Hall | Dec. 11, 1928 |
| 1,719,563 | Seaberg | July 2, 1929 |
| 1,794,721 | McCash | Mar. 3, 1931 |
| 1,863,836 | Derby et al. | June 21, 1932 |
| 2,269,741 | Seeger | Jan. 13, 1942 |
| 2,452,065 | Moran et al. | Oct. 26, 1948 |

FOREIGN PATENTS

| Number | Country | Date |
|---|---|---|
| 447,751 | Germany | July 23, 1927 |